United States Patent [19]
Fukuda et al.

[11] Patent Number: 6,004,693
[45] Date of Patent: Dec. 21, 1999

[54] NON-AQUEOUS ELECTROLYTE CELL

[75] Inventors: Yutaka Fukuda; Koji Hanafusa; Keiichi Tanaka, all of Kanuma, Japan

[73] Assignee: Sumitomo Electric Industries, Ltd., Osaka, Japan

[21] Appl. No.: 08/981,716

[22] PCT Filed: Apr. 23, 1997

[86] PCT No.: PCT/JP97/01396

§ 371 Date: Dec. 23, 1997

§ 102(e) Date: Dec. 23, 1997

[87] PCT Pub. No.: WO97/40539

PCT Pub. Date: Oct. 30, 1997

[30] Foreign Application Priority Data

Apr. 23, 1996 [JP] Japan .................................. 8-101356

[51] Int. Cl.$^6$ .............................. H01M 2/04; H01M 2/06
[52] U.S. Cl. ......................... 429/176; 429/175; 429/177; 429/324
[58] Field of Search ..................... 429/176, 178, 429/175, 324, 177

[56] References Cited

FOREIGN PATENT DOCUMENTS

| 0397248A2 | 11/1990 | European Pat. Off. . |
| 57-115820 | 7/1982 | Japan . |
| 125360 | 8/1983 | Japan . |
| 3-62447 | 3/1991 | Japan . |

OTHER PUBLICATIONS

Muneaki Nakai, "Lithium–Iodine Complex Battery with Solid Electrolyte", Jun. 13, 1981, Publication No. 56–71278.

Koroku Namekawa, "Supersonic Acceleration Measuring Apparatus for Moving Reflecting Object", Mar. 18, 1987, Publication No. 62–62268.

Kiichi Koike, "Sealed Lead–Acid Battery", Oct. 25, 1986, Publication No. 61–240564.

*Primary Examiner*—John S. Maples
*Attorney, Agent, or Firm*—Pillsbury Madsion & Sutro LLP

[57] ABSTRACT

The present invention provides a nonaqueous electrolyte battery 10 comprising a nonaqueous electrolytic solution 20; positive and negative plates 34 and 36 in contact with the nonaqueous electrolytic solution 20; a separator 38 disposed between the positive and negative plates 34 and 36; a first lead 18a having one end connected to the positive plate 34 and the other end extending to the outside; a second lead 18b having one end connected to the negative plate 36 and the other end extending to the outside; and a sealed bag 14 for sealing therein the positive and negative plates 34 and 36, the nonaqueous electrolytic solution 20, the separator 38 and parts of the first and second leads 18a and 18b; wherein the sealing bag 14 has a hot-melt resin layer 24, a metal layer 22 disposed outside the hot-melt resin layer 24, and an electrolytic-solution-barrier insulating layer 26 disposed between the hot-melt resin layer 24 and metal layer 22. The electrolytic-solution-barrier insulating layer 26 comprises nylon or ethylene/vinyl alcohol copolymer and exhibits a very low compatibility with nonaqueous electrolytic solution 20. Consequently, the heat-sealing portion 12 has an enhanced blocking property against the nonaqueous electrolytic solution 20, thus improving the hermetic property of the sealed bag 14.

2 Claims, 3 Drawing Sheets

NON-AQUEOUS ELECTROLYTE CELL

This application is the national phase of international application PCT/JP97/01396 filed Apr. 23, 1997 which designated the U.S.

1. Technical Field

The present invention relates to a nonaqueous electrolyte battery used as a power source for electronic instruments.

2. Background Art

In conjunction with a demand for electronic instruments having a smaller size and a lighter weight, there has been an increasing demand for batteries having a smaller size and a lighter weight to be used for their power source. In order to satisfy such a demand for batteries, various batteries have been taken into consideration.

For example, Japanese Patent Application Laid-Open No. 61-240564 discloses an enclosed type lead storage battery. In this storage battery, a bag made of an acid-resistant thermoplastic resin accommodating a number of electrode plates inserted therein is enclosed in a jacket formed by a film, sheet, or tube.

In the battery disclosed in Japanese Patent Application Laid-Open No. 61-240564, however, since peripheral parts of metal leads and the jacket are sealed while being directly in contact with each other, its hermetic property is low.

Also, Japanese Patent Application Laid-Open No. 56-71278 discloses a sheet-like battery. In this battery, while the part occupied by its heat-fusing portion is reduced, a lead which has been coated with a resin beforehand is used to improve the reliability of its heat fusion.

The bag for sealing the battery system disclosed in Japanese Patent Application Laid-Open No. 56-71278, however, is formed by a single iodine-resistant fluorine resin. Consequently, in the case of a nonaqueous electrolyte battery whose electrolytic solution is volatile or of an organic solvent system, there is a strong tendency for the electrolytic solution to penetrate through the bag to leak out or for moisture to infiltrate therein from the outside, thereby yielding an inferior hermetic property.

Further, in the battery disclosed in Japanese Patent Application Laid-Open No. 3-62447 or No. 57-115820, its electrode, electrolyte, and the like are sealed in a bag in which a plastic layer made of an acrylic acid modified polyethylene or acrylic acid modified polypropylene ionomer and a metal layer are bonded together.

In the battery disclosed in Japanese Patent Application Laid-Open No. 3-62447 or No. 57-115820, however, the plastic layer made of the acrylic acid modified polyethylene or acrylic acid modified polypropylene ionomer is separated from the bag at a high temperature. Consequently, the hermetic property of the battery is not sufficient.

Thus, the blocking property against the nonaqueous electrolytic solution becomes insufficient, whereby a battery having a sufficient hermetic property has not been obtained yet.

Accordingly, it is an object of the present invention to provide a nonaqueous electrolyte battery having a high blocking property against the nonaqueous electrolytic solution and a high hermetic property.

DISCLOSURE OF THE INVENTION

The present invention provides a nonaqueous electrolyte battery comprising a nonaqueous electrolytic solution; positive and negative electrodes in contact with the nonaqueous electrolytic solution; a separator disposed between the positive and negative electrodes; a first lead having one end connected to the positive electrode and the other end extending to the outside; a second lead having one end connected to the negative electrode and the other end extending to the outside; and a bag for sealing therein the positive and negative electrodes, the separator, the nonaqueous electrolytic solution, and parts of the first and second leads; wherein the bag has a hot-melt resin layer, a metal layer disposed outside the hot-melt resin layer, and an electrolytic-solution-barrier insulating layer disposed between the hot-melt resin layer and the metal layer.

The electrolytic-solution-barrier insulating layer exhibits a very low compatibility with the nonaqueous electrolytic solution. Consequently, the bag attains an enhanced blocking property against the nonaqueous electrolytic solution, thereby improving its hermetic property. Also, the electrolytic-solution-barrier insulating layer has an electrical insulation property. Accordingly, the battery reaction in the bag with an improved hermetic property is efficiently effected without being inhibited by the metal layer.

Preferably, the electrolytic-solution-barrier insulating layer comprises at least one member selected from the group consisting of polyamide resins and ethylene/vinyl alcohol copolymers.

A polyamide resin or ethylene/vinyl alcohol copolymer exhibits a very low compatibility with nonaqueous electrolytic solutions. Consequently, the bag attains an improved reliability concerning its hermetic property.

Also, the hot-melt resin layer preferably comprises at least one member selected from the group consisting of acrylic acid modified polyolefins, metacrylic acid modified polyolefins, and maleic acid modified polyolefins.

It is due to the fact that such a hot-melt resin layer is excellent in its adhesive property and heat-fusing property with respect to the electrolytic-solution-barrier insulating layer.

BEST MODE FOR CARRYING OUT THE INVENTION

Figure 1:
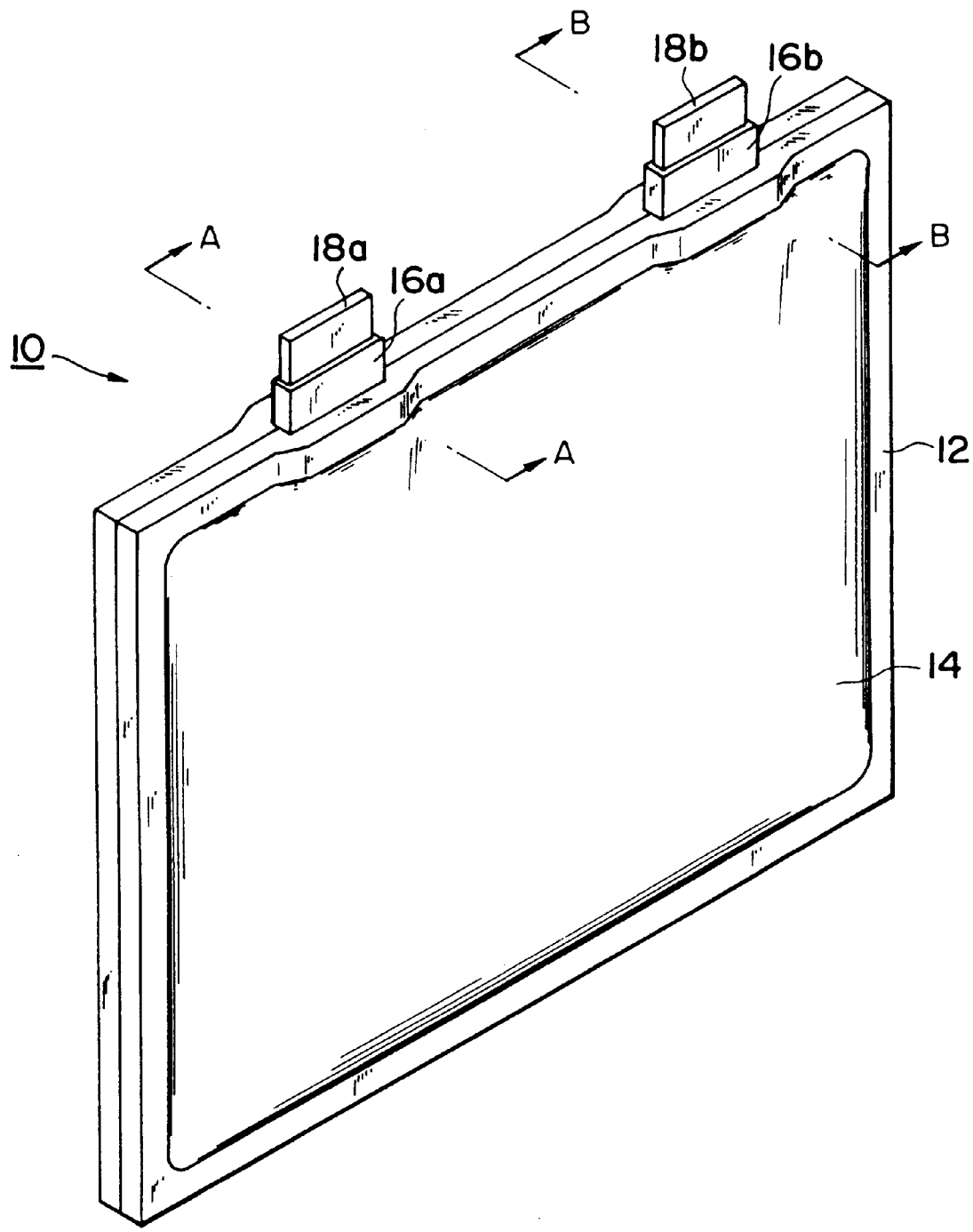
FIG. 1 is a perspective view schematically showing an embodiment of the nonaqueous electrolyte battery in accordance with the present invention.

For further detailed description, the present invention will be explained with reference to the accompanying drawings. Here, in the drawings, parts identical or equivalent to each other will be referred to with marks identical to each other.

FIG. 1 is a perspective view schematically showing an embodiment of the nonaqueous electrolyte battery in accordance with the present invention. This nonaqueous electrolyte battery 10 is constituted when a single electrochemical cell containing a nonaqueous electrolytic solution in which an electrolyte (e.g., lithium compound) has been dissolved in a nonaqueous medium (e.g., organic solvent) is sealed in a sealing bag (bag) 14 whose peripheral part has been heat-fused to form a heat-sealing portion 12. From the upper part of the sealing bag 14, one end of a first lead 18a coated with an insulator 16a at its peripheral part extends upward, whereas one end of a second lead 18b coated with an insulator 16b at its peripheral part extends upward, thus allowing them to be electrically connected to the outside.

Figure 2:
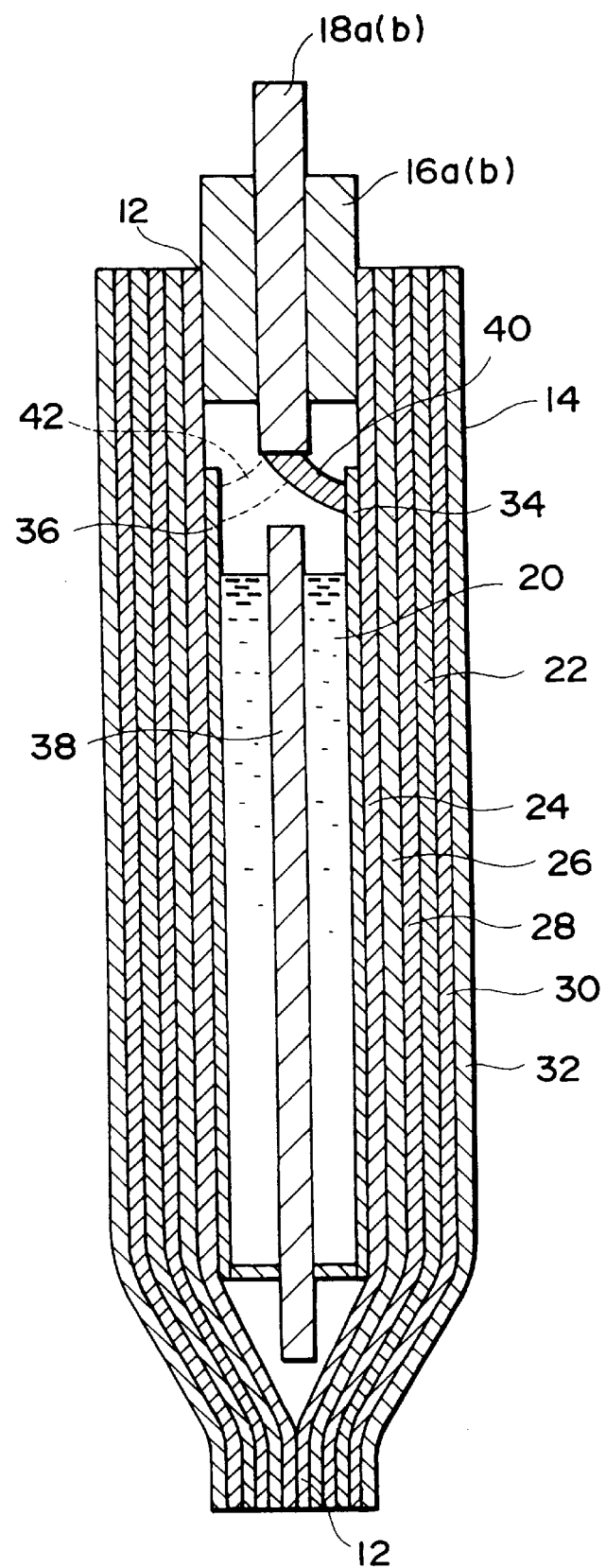
FIG. 2 is a sectional view taken along line A—A or line B—B of FIG. 1.

FIG. 2 is a sectional view of the nonaqueous electrolyte battery 10 taken along line A—A or line B—B of FIG. 1. As depicted, from the viewpoint of reducing the size and weight of the nonaqueous electrolyte 10, the sealing bag 14 is formed by heat-fusing the peripheral parts of a film. This film has a multilayer configuration including a metal layer 22 (metal foil) therein. Since a hot-melt resin layer 24, which is located at the innermost part of the multilayer film and whose peripheral part is heat-fused, is in contact with a nonaqueous electrolytic solution 20, the one that does not dissolve in the nonaqueous electrolytic solution 20 is necessary.

Since the hot-melt resin layer 24 is basically made of a thermoplastic resin, however, its strength may be lost at a high temperature, whereby the nonaqueous electrolytic solution 20 may leak out. Thus leaked nonaqueous electrolytic solution 20 causes each layer of the multilayer film to peel off. Accordingly, it is difficult for the hot-melt resin layer 24 by itself to secure the hermetic property of the bag 14 against the nonaqueous electrolytic solution 20. Also, in this case, not only the leakage occurs but also, since the nonaqueous electrolytic solution comes into contact with the metal layer 22, a desired battery reaction by way of electrodes may not be effected.

Accordingly, in this embodiment, in order to prevent the nonaqueous electrolytic solution 20 from leaking and secure electric insulation even at a high temperature, an electrolytic-solution-barrier insulating layer 26, which is excellent in electrolytic-solution-barrier and insulation properties, is disposed between the hot-melt resin layer 24 and the metal layer 22. Here, the electrolytic-solution-barrier property refers to a capability to hold therein an electrolyte sealed in a sealing bag without leaking it out, whereas the insulating property refers to a capability to block external electricity without leaking out current.

Preferable examples of the material excellent in electrolytic-solution-barrier and insulation properties are polyamide resins such as nylon 6 and nylon 6,6 or ethylene/vinyl alcohol copolymers. It is due to the fact that such a material exhibits a low compatibility with the above-mentioned nonaqueous electrolytic solution 20 even at a high temperature while being highly adhesive to the hot-melt resin layer 24 and the metal layer 20.

Preferably, the thickness of the electrolytic-solution-barrier insulating layer 26 is within the range of 10 $\mu$m to 200 $\mu$m. It is due to the fact that, when the thickness is less than 10 $\mu$m, pinholes may occur in the heat-sealing portion 12 and the like, and the electrolytic-solution-barrier property tends to be lost; whereas, when the thickness is greater than 200 $\mu$m, the amount of flowing resin may become so much upon heat-sealing that a forced distortion is imparted to the metal layer 22 and, in the worst case, it may cause breakages in the sealing bag 14.

The hot-melt resin layer 24 preferably comprises an acrylic acid modified polyolefin, metacrylic acid modified polyolefin, or maleic acid modified polyolefin. It is due to the fact that such hot-melt resin layer 24 is excellent in the adhesivity with respect to the electrolytic-solution-barrier insulating layer 26 and tends to be excellent in heat-sealing property.

Preferably, the thickness of the hot-melt resin layer 24 is within the range of 10 $\mu$m to 200 $\mu$m. It is due to the fact that, when the thickness is less than 10 $\mu$m, its heat-sealing property tends to deteriorate; whereas, when the thickness is greater than 200 $\mu$m, the amount of flowing resin tends to become so much upon heat-sealing that a forced distortion is imparted to the metal layer 22 and, in the worst case, it may cause breakages in the sealing bag 14.

Here, the multilayer film is not always constituted alone by those mentioned above. Disposed between the metal layer 22 and the hot-melt resin layer 24 is not limited to the electrolytic-solution-barrier insulating layer 26. As shown in FIG. 2, an intermediate resin layer 28 having a relatively low melting point may be disposed between the metal layer 22 and the electrolytic-solution-barrier insulating layer 26. In the case where such intermediate resin layer 28 is disposed between the metal layer 22 and the electrolytic-solution-barrier insulating layer 26, the intermediate resin layer 28 can bond to both of the layers. In this case, for example, acid-modified polyolefins may be mentioned as the material for the intermediate resin layer 28.

Further, a layer 32 for securing the mechanical strength of the sealing bag 14 may be disposed outside the metal layer 22. In this case, the layer 32 preferably comprises biaxially-oriented polyethylene terephthalate or a biaxially-oriented nylon film. It is due to the fact that such layer 32 is excellent in mechanical strength such as resistance to wear. Also, in this case, a layer 30 is preferably provided as an adhesive layer for bonding the metal layer 22 and the layer 32 together.

The nonaqueous electrolyte battery 10 is quite suitably used as a power source for an electronic instrument such as personal computer which generates a large amount of heat. During the operation of such an electronic instrument, the temperature of the place where the battery is disposed may reach about 85° C. Nevertheless, since the above-mentioned electrolytic-solution-barrier insulating layer 26 is provided, the adhesivity and the like are maintained even at the high temperature, whereby the nonaqueous electrolyte battery can operate stably.

Sealed in the sealing bag 14 are a positive plate 34 and a negative plate 36 which are impregnated with the nonaqueous electrolytic solution 20. Each of the positive plate 34 and negative plate 36 comprises a metal base (not depicted) of a metal foil or expanded metal, which is known as a collector, and an active material layer (not depicted) formed on the metal base. Disposed between the positive plate 34 and the negative plate 36 is a separator 38 for preventing the nonaqueous electrolytic solution 20 from diffusing. One end of the first lead 18$a$, 18$b$ is connected to a lead 40 on the metal base of the positive plate 34 by spot welding, ultrasonic welding, or the like, for example, whereas its other end extends to the outside of the sealing bag 14 as mentioned above. Similarly, one end of the second lead 18$b$ is connected to a lead 42 on the metal base of the negative plate 36 by spot welding, ultrasonic welding, or the like, for example, whereas its other end extends to the outside of the sealing bag 14 as mentioned above.

The insulators 16$a$ and 16$b$ respectively disposed so as to cover the peripheral parts of the first and second leads 18$a$ and 18$b$ are heat-fused with the hot-melt resin layer 24 of the sealing bag 14, thereby securing an airtightness between the first and second leads 18$a$ and 18$b$ and the sealing bag 14. Also, in this case, the insulator layers 16$a$ and 16$b$ at the peripheral parts of the first and second leads 18$a$ and 18$b$ are heat-fused with the multilayer film so as to form the heat-sealing portion 12, thereby attaining a high airtightness similar to that mentioned above at a high temperature.

Referring to FIG. 1, each of the first and second leads 18$a$ and 18$b$ has a band-like form (with a flat rectangular cross section). It is due to the fact that, in the case of such a form, even when the capacity of the battery is enhanced, the outer peripheries of the insulators 16a and 16b can be restrained from increasing, thus allowing the first and second leads 18a and 18b to have a greater cross-sectional area. Consequently, a gap is restrained from occurring at the heat-sealing portion 12 formed by heat fusion between the outer surfaces of the insulators 16a and 16b and the hot-melt resin layer 24 of the sealing bag 14. Accordingly, the reliability concerning airtightness is improved at the heat-sealing portion 12.

By contrast, in the case where the first or second lead has a circular cross section, when the battery has a large capacity, the outer periphery of the insulator becomes longer as the diameter of the cross section of the first or second lead increases. Consequently, at the above-mentioned heat-sealing portion, a gap is likely to occur, whereby the reliability concerning airtightness tends to deteriorate at the heat-sealing portion.

Also, the first and second leads 18a and 18b with a rectangular cross section each have a large contact area. Consequently, for example, they can be connected to an external circuit using an FPC (flexible printed circuit board) or the positive and negative electrodes more easily by spot welding or ultrasonic welding, while enabling connection with a high reliability.

The first lead connected to the positive plate is preferably made of a material which does not dissolve at the time of discharging, e.g., aluminum, titanium, or their alloy. The lead connected to the negative plate is preferably made of a material which does not form a deposit at the time of overcharging or which is hard to form an alloy and dissolve at the time of over-discharging during which the potential difference is greater, e.g., nickel, copper, or their alloy. Hence, when such a material is used for the second lead of the negative plate, for example, lithium is restrained from depositing at the time of overcharging, and a lithium alloy is restrained from being formed at the time of over-discharging.

In the following, though not depicted, a method of making the nonaqueous electrolyte battery will be explained. First, a method of making a positive plate will be explained.

Initially, an active material for the positive electrode is dissolved into an appropriate solvent so as to yield a paste, which is then applied to a metal base such as an aluminum foil except for its portion where the lead is to be attached. Thereafter, with the active material dried, the metal base is subjected to roller-pressing, whereby the positive plate is obtained. The method of making a negative plate is substantially the same as that of making the positive plate except that an active material for the negative electrode is applied to a metal base such as a copper foil.

In the following, a method of making a sealing bag will be explained.

Initially, a plurality of sheets of multilayer films each including an intermediate insulating layer comprising nylon or ethylene/vinyl alcohol copolymer disposed between a plastic layer formed on its surface and a metal layer therein are prepared and cut into rectangles with an appropriate size. Then, the multilayer films are superposed on each other such that their plastic layers oppose each other. In this state, a sealing machine is used so as to heat-seal three surrounding sides of the rectangle by a desired sealing width under a predetermined heating condition, whereby a pouched sealing bag is obtained.

Between thus obtained positive and negative plates, a microporous diaphragm (separator) made of polypropylene, for example, is disposed. Then, a first lead for the positive plate, which has a rectangular cross section and is made of aluminum, for example, and a second lead for the negative plate, which has a rectangular cross section and is made of copper, for example, are prepared. An insulator layer is formed at the peripheral part of each of the first and second leads. Thereafter, the part of metal base for the positive electrode not coated with the active material is connected to the first lead by ultrasonic welding. Also, the part of metal base for the negative electrode not coated with the active material is connected to the second lead by ultrasonic welding.

In this state, the positive plate, the negative plate, the first lead, the second lead, and the like are accommodated in the sealing bag. Thereafter, a desired nonaqueous electrolytic solution is injected therein. Then, while insulators for the first and second leads are held by the peripheral part of the opening portion of the sealing bag, the sealing machine is used to heat-fuse together the exterior layers of the insulators of the first and second leads and the inner layers of the peripheral part of the sealing bag by a desired width under a predetermined heating condition, whereby a nonaqueous electrolyte battery is obtained.

Figure 3:
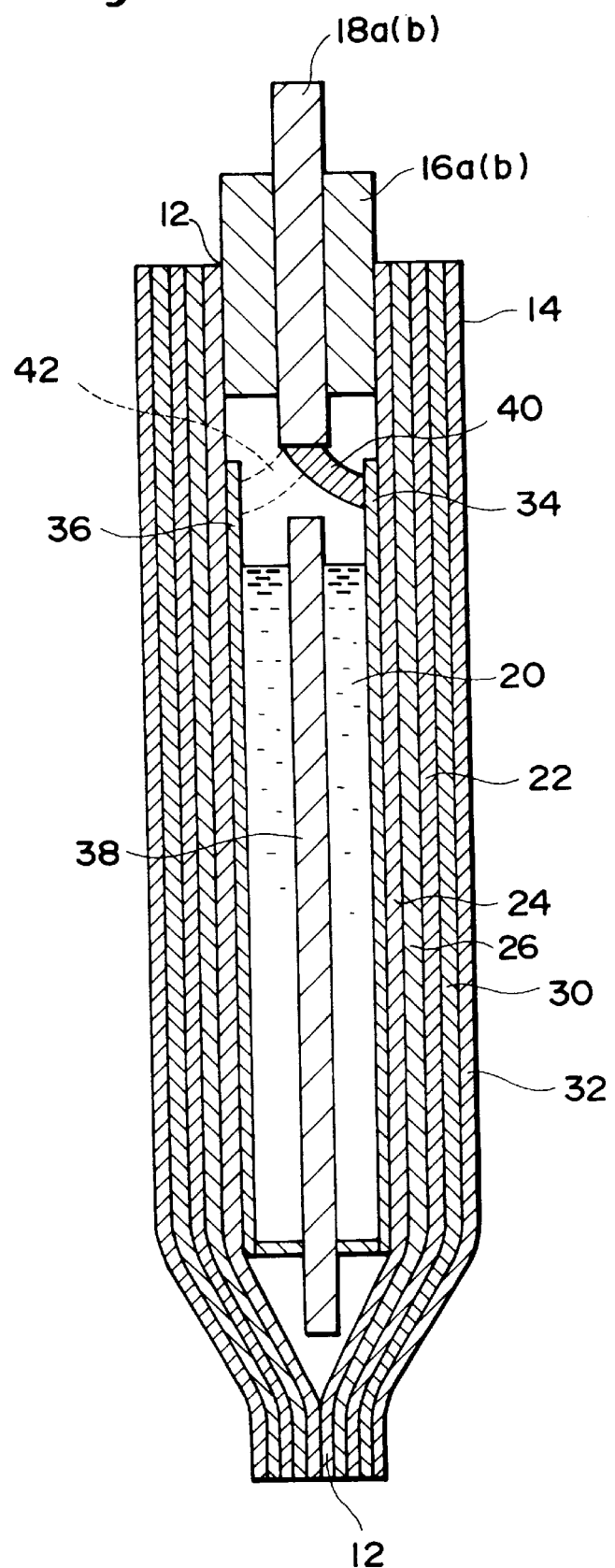
FIG. 3 is a sectional view schematically showing another embodiment of the nonaqueous electrolyte battery in accordance with the present invention.

Here, the nonaqueous electrolyte battery of the present invention is not restricted to that mentioned above. FIG. 3 is a sectional view showing another embodiment of the nonaqueous electrolyte battery in accordance with the present invention. The depicted embodiment is the same as the foregoing embodiment except that the multilayer film of the sealing bag 14 does not have the intermediate resin layer. Since the intermediate resin layer does not affect the electrolytic-solution-barrier property, the nonaqueous electrolyte battery 10 can attain a lighter weight when there is no intermediate resin layer.

In the following, the present invention will be explained in detail with reference to Examples and Comparative Examples, which by no means restrict the present invention.

EXAMPLES

Examples 1 and 2 and Comparative Examples 1 and 2

First, a positive plate was made as follows. Initially, 100 parts by weight of $LiCoO_2$ powder (manufactured by Nippon Chemical Industrial Co., Ltd.), 10 parts by weight of graphite, and 10 parts by weight of polyvinylidene fluoride were used as active materials for the positive electrode and mixed together. Subsequently, the mixture of $LiCoO_2$, graphite, and polyvinylidene fluoride was dissolved in N-methyl-2-pyrrolidone and then was turned into a paste form. Thus obtained paste-like mixture was applied to one side of an aluminum foil having a thickness of 20 $\mu$m, except for its portion where a lead was to be connected. Thereafter, the mixture was dried and then was subjected to roller-pressing, whereby a positive plate having a thickness of 0.1 mm, a width of 50 mm, and a length of 105 mm was obtained.

Next, a negative plate was made. Namely, 100 parts by weight of flake natural graphite powder and 20 parts by weight of polyvinylidene fluoride were used as active materials for the negative electrode and mixed together. Subsequently, the resulting mixture was dissolved in N-methyl-2-pyrrolidone and then was turned into a paste form. Thus obtained paste-like mixture was applied to both sides of a copper foil having a thickness of 20 $\mu$m, except for its portion where a lead was to be connected. Thereafter, the mixture was dried and then was subjected to roller-pressing, whereby a negative plate having a thickness of 0.1 mm, a height of 50 mm, and a width of 105 mm was obtained.

Next, a sealing bag was made. Initially, a plurality of sheets of multilayer films each comprising four to six layers successively mounted from a polyethylene terephthalate (PET) layer to a maleic acid modified low density polyethylene (LDPE) or acrylic acid modified polyethylene (PE) layer as shown in Table 1 were prepared and cut into rectangles each having a height of 70 mm and a width of 135 mm. Then, the multilayer films were superposed on each other such that the maleic acid modified low density polyethylene layers in the multilayer films opposed each other. In this state, a sealing machine was used to heat-seal three surrounding sides of the rectangle with a sealing width of 5 mm by heating them for 5 seconds at 200° C., whereby a pouched sealing bag was obtained.

and humidity was 95%, and then their change in weight and the change in moisture content in the nonaqueous electrolytic solution were measured, so as to evaluate the blocking properties of the heat-sealing portion against the nonaqueous electrolytic solution. Here, the moisture content in the nonaqueous electrolytic solution was measured by Karl Fischer technique.

As a result, the amounts of evaporated nonaqueous electrolytic solution in Examples 1 and 2 after the 720-hour test were respectively 2.5% and 2.4% of the weights of the sample batteries. Also, no separation of the multilayer films was observed. By contrast, in Comparative Examples 1 and 2, after the 720-hour test, the nonaqueous electrolytic solution hardly existed in the sealing bag, and leakage was

TABLE 1

| EXAMPLE 1 | EXAMPLE 2 | COMPARATIVE EXAMPLE 1 | COMPARATIVE EXAMPLE 2 |
| --- | --- | --- | --- |
| PET (12 μm) | PET (12 μm) | PET (12 μm) | PET (12 μm) |
| MALEIC ACID MODIFIED LDPE (15 μm) | MALEIC ACID MODIFIED LDPE (15 μm) | MALEIC ACID MODIFIED LDPE (15 μm) | MALEIC ACID MODIFIED LDPE (15 μm) |
| ALUMINUM (10 μm) | ALUMINUM (10 μm) | ALUMINUM (10 μm) | ALUMINUM (10 μm) |
| MALEIC ACID MODIFIED LDPE (50 μm) | NYLON 6 (25 μm) | MALEIC ACID MODIFIED LDPE (100 μm) | ACRYLIC ACID MODIFIED PE (100 μm) |
| ETHYLENEN/VINYL ALCOHOL COPOLYMER (20 μm) | MALEIC ACID MODIFIED LDPE (50 μm) | | |
| MALEIC ACID MODIFIED LDPE (50 μm) | | | |

A microporous diaphragm made of polypropylene was disposed between thus obtained positive and negative plates. Here, the thickness of the diaphragm was 25 μm.

Then, as the first lead for the positive plate, a rectangular aluminum conductor having a cross section with a thickness of 0.1 mm and a width of 4 mm was prepared. Also, as the second lead for the negative plate, a rectangular copper conductor having a cross section with a thickness of 0.1 mm and a width of 4 mm was prepared. Then, peripheral parts of such first and second leads were coated with insulating layers comprising maleic acid modified polyethylene. Thereafter, the part of aluminum foil for the positive plate not coated with the active material was connected to the first lead by ultrasonic welding. Also, the part of copper foil for the negative plate not coated with the active material was connected to the second lead by ultrasonic welding.

In this state, the positive plate, the negative plate, the first lead, the second lead, and the like were accommodated in the sealing bag, and then 8 cc of a nonaqueous electrolytic solution was injected therein. Here, used as the nonaqueous electrolytic solution was the one comprising a mixed solvent of ethylene carbonate and diethyl carbonate at a volume ratio of 1:1 and lithium hexafluorophosphate dissolved therein with a concentration of 1 mol/l.

Thereafter, the insulators for the first and second leads were held by the peripheral part of the opening portion of the sealing bag. Then, the sealing machine was used to heat-fuse together the insulator layers of the first and second leads and the inner layers of the peripheral part of the sealing bag, whereby sample batteries were obtained. Here, the sealing width was 10 mm, whereas the heating was effected for 5 seconds at 200° C.

Thus obtained sample batteries were subjected to a constant temperature and humidity test, by which their properties were investigated. In the constant temperature and humidity test, the sample batteries were held for 720 hours in an RH thermo-hygrostat in which temperature was 85° C.

observed. Also, the multilayer film was found to be separated within 340 hours and 410 hours in Comparative Examples 1 and 2, respectively. Accordingly, Examples 1 and 2 were found to exhibit a high blocking property against the nonaqueous electrolytic solution at a high temperature.

Next, the samples of Examples 1 and 2, which did not cause leaking in the constant temperature and humidity test, were subjected to a cyclic charging and discharging test. Namely, each sample battery was subjected to a cyclic charging and discharging test in which the current density was 0.4 mA/cm$^2$ and the charging and discharging voltage was within the range of 2.75 to 4.1 V. As a result, it was found that the discharged capacities in Examples 1 and 2 at 300 cycles were respectively 82% and 79% of their discharged capacity at the initial 10 cycles, thus being maintained at a high level. Accordingly, also from the results of the cyclic test for the battery, it was found that they had a high blocking property against the nonaqueous electrolytic solution.

Industrial Applicability

In the present invention, since a bag for a nonaqueous electrolyte battery is provided with an electrolytic-solution-barrier insulating layer comprising polyamide or ethylene/vinyl alcohol copolymer, the nonaqueous electrolyte battery exhibits a high blocking property against the nonaqueous electrolytic solution at a high temperature. Accordingly, when used as a power source for an electronic instrument generating a large amount of heat, the nonaqueous electrolyte battery in accordance with the present invention can operate with a high reliability.

We claim:

1. A nonaqueous electrolyte battery comprising:
   a nonaqueous electrolytic solution;
   positive and negative electrodes in contact with said nonaqueous electrolytic solution;
   a separator disposed between said positive and negative electrodes;

a first lead having a first end and a second end, said first end connected to said positive electrode;

a second lead having a first end and a second end, said first end connected to said negative electrode;

a bag for sealing therein said positive and negative electrodes, said nonaqueous electrolytic solution, said separator and parts of said first and second leads, wherein the second end of said first lead extends outside of said bag, and the second end of the second lead extends outside of said bag;

wherein said bag has a hot-melt resin layer, a metal layer disposed outside said hot-melt resin layer, and an electrolytic-solution-barrier insulating layer comprising ethylene/vinyl alcohol copolymers, said electrolytic-solution-barrier insulating layer being disposed between said hot-melt resin layer and said metal layer.

2. A nonaqueous electrolyte battery according to claim 1, wherein said hot-melt resin layer comprises at least one member selected from the group consisting of acrylic acid modified polyolefins, metacrylic acid modified polyolefins, and maleic acid modified polyolefins.

\* \* \* \* \*